United States Patent [19]

Smilanich et al.

[11] Patent Number: 4,663,247
[45] Date of Patent: May 5, 1987

[54] COILED ELECTRODE ASSEMBLY CELL CONSTRUCTION WITH PRESSURE CONTACT MEMBER

[75] Inventors: Nicholas J. Smilanich, Rocky River; John A. Wesner, Avon Lake, both of Ohio

[73] Assignee: Union Carbide Corporation, Danbury, Conn.

[21] Appl. No.: 794,838

[22] Filed: Nov. 4, 1985

[51] Int. Cl.$^4$ ............................................. H01M 6/10
[52] U.S. Cl. ...................................... 429/94; 429/177; 429/178
[58] Field of Search ................. 429/94, 178, 175, 177, 429/211

[56]  References Cited
U.S. PATENT DOCUMENTS

| | | | |
|---|---|---|---|
| 3,257,238 | 6/1966 | Andre | 429/94 |
| 3,775,182 | 11/1973 | Patton et al. | 429/194 |
| 3,796,606 | 3/1974 | Lehmann et al. | 429/94 |
| 3,900,340 | 8/1975 | Greaser et al. | 429/94 |
| 3,951,687 | 4/1976 | Takamura et al. | 429/94 |
| 4,048,389 | 9/1977 | Bubnick et al. | 429/101 |
| 4,154,906 | 5/1979 | Bubnick et al. | 429/94 |
| 4,347,293 | 3/1932 | Goebel et al. | 429/105 |
| 4,431,719 | 2/1984 | Urry | 429/105 |
| 4,454,208 | 6/1984 | Osmialowski | 429/163 |
| 4,476,202 | 10/1984 | Wesner | 429/94 |
| 4,539,271 | 9/1985 | Crabtree | 429/94 |
| 4,565,752 | 1/1986 | Goebel et al. | 429/94 |

FOREIGN PATENT DOCUMENTS 58-131980  8/1983  Japan .
2122413A  1/1984  United Kingdom .

Primary Examiner—Anthony Skapars

[57] ABSTRACT

A sealed galvanic cell comprising a container and a cover having a coiled electrode assembly disposed in the container. The coiled electrode assembly has an inner exposed electrode of one polarity and an outer exposed electrode of the opposite polarity. A flexible electrically conductive member secured to the cover makes electrical contact with the inner exposed electrode and exerts a radially outward force therein while the outer exposed electrode makes electrical contact with the wall of the container.

23 Claims, 14 Drawing Figures

COILED ELECTRODE ASSEMBLY CELL CONSTRUCTION WITH PRESSURE CONTACT MEMBER

FIELD OF THE INVENTION

This invention relates to a coiled electrode assembly cell construction which has a pressure contact member that makes electrical contact between an electrode in the coiled electrode assembly and an electrically conductive terminal.

BACKGROUND OF THE INVENTION

The galvanic cell/battery has become a primary source for many portable electronic devices such as radios, hearing aids, watches, calculators and the like. In order to maintain the overall electronic devices as compact as possible, the electronic devices are usually designed with cavities to accommodate batteries as their power source. The cavities are usually made so that a battery can be snugly positioned therein, thus making electronic contact with appropriate terminals within the device. To accommodate the electronic component manufacturers, the battery industry has adopted several conventional size cells which the manufacturer can rely upon in designing their devices which require portable power sources. Due to the large number of battery-powered devices on the market, there has been a demand for increased power output capacities of standard size cells. Accordingly, various anode-cathode couples have been employed so as to provide a sufficient output capacity to operate various devices. A problem has been encountered, however, when the density of the electrode bodies has to be increased in certain cell systems if maximum output power is to be achieved. Consequently, when increasing the density of the electrode bodies many problems are encountered and they are addressed in a variety of ways. For example, organic electrolyte cells utilizing solid depolarizers have gained considerable interest for applications usually filled by aqueous alkaline cell systems. However, one drawback in the use of organic electrolyte cell systems is that they have relatively low conductivities compared to conventional aqueous cell systems of equivalent size and construction.

To increase the interfacial area contact between active cell components and thereby decrease the resistance of the cell, coiled electrode assemblies have been employed. This type of cell construction employs spirally rolled or coiled electrode assemblies (jelly roll construction) which are widely known in the battery art and are usually placed in a composite housing which serves as the current conductive terminals for the cells. In such structures, the electrode of one polarity is generally electrically connected to a conductive housing portion, and the electrode of the opposite polarity is generally electrically connected to another conductive housing portion which is insulated relative to the electrically conductive first-mentioned housing portion. The electrical contact between each electrode and its respective housing portion is generally formed by an elongated flexible electrically conductive connecting tab or element which is secured at one end to the electrode and at the other end is secured to the respective housing portion.

The current collector tabs are attached to the electrodes (or electrode carriers), usually by welding. This technique involves time-consuming manual operations in cell assembly procedures which reduces line productivity and adds to the manufacturing costs. The problems associated with such manual operations become more difficult when the above-mentioned techniques are applied to smaller size cells.

It is therefore an important object of this invention to provide an electrical contact between an inner exposed electrode of a coiled electrode assembly and an electrically conductive terminal using a flexible electrically conductive member.

It is a further object of this invention to provide a sealed galvanic cell having a coiled electrode assembly construction in which the danger of cell shorting due to tearing of the separator during cell assembly is reduced.

It is another object of this invention to provide a flexible electrically conductive member that is secured inside the galvanic cell by the clamping coaction of an inner cover and an outer cover.

It is another object of this invention to provide a coiled electrode assembly cell that is inexpensive to manufacture and easy to assemble.

The foregoing and additional objects will become fully apparent from the following description and the accompanying drawings.

SUMMARY OF THE INVENTION

This invention relates to a sealed galvanic cell comprising a coiled electrode assembly housed in a conductive container having a base with an upstanding wall defining an open end and closed by a cover; the coiled electrode assembly comprises a first electrode, a second electrode superimposed on the first electrode and a separator disposed between the first electrode and the second electrode and over at least one of the first and second electrodes; and the first electrode, second electrode and separator spirally wound such that the first electrode is electronically insulated from the second electrode by the separator and a portion of the first electrode is exposed to define at least a portion of the outer wall of the coiled electrode assembly and a portion of the second electrode is exposed to define at least a portion of the inner wall of the coiled electrode assembly; the coiled electrode assembly disposed within the container such that the exposed first electrode defining at least a portion of the outer wall of the coiled electrode assembly is in pressure contact with the container thereby adapting the container as the first terminal for the galvanic cell; a flexible electrically conductive member disposed within the opening defined by the inner wall of the coiled electrode assembly and pressure contacting at least a portion of the exposed surface of the second electrode and exerting a radially outward force on the exposed second electrode defining a portion of the inner wall of the coiled electrode assembly; and the flexible electrically conductive member is secured to an electrically conductive terminal at the exterior surface of the galvanic cell, the electrically conductive terminal being electrically insulated from the first terminal so that the electrically conductive terminal is adapted as the second terminal for the galvanic cell.

The coiled electrode assembly of this invention typically comprises two electrodes and a separator. One electrode acts as an anode and the other serves as a cathode. The anode, cathode and separator are made of flexible material and are typically formed into strips and superimposed upon each other. This is accomplished by superimposing the anode strip over the cathode strip with the separator strip interposed between the two electrode strips. This assembly is then spirally rolled to form the coiled electrode assembly which is preferably cylindrical in outer contour and which has a central opening. This central opening in the coiled electrode assembly is typically cylindrical, however, it could be elliptical or of any other configuration.

To provide for electrical contacts a portion of one end of each electrode strip is left exposed such that when the electrode-separator assembly is wound into a coil there is an outer exposed portion of the first electrode and an inner exposed portion of the second electrode. In some embodiments the coiled electrode assembly could be coiled over or around a hollow electrically conductive mandrel in which the mandrel is in electrical contact with the inner wound electrode, so that the mandrel is adapted as the inner exposed electrode of the coiled electrode assembly. When the coiled electrode assembly is inserted into the cell container the outer exposed portion of the electrode makes electrical contact with the interior wall of the conductive container, the container thereby serving as one terminal, while the inner exposed portion of the electrode makes contact with one end of a flexible electrically conductive member. The opposite end of the flexible electrically conductive member is connected to a terminal insulated from the container and secured on the cell housing and thereby serves as the opposite polarity terminal for the galvanic cell.

The flexible electrically conductive member can have different shapes. In one embodiment it has a U-shaped lower section while the upper section is composed of tabs that project in an opposite direction. In another embodiment the upper section is a disc-shaped structure that acts as an inner cover. In yet another embodiment the lower section could be composed of a plurality of U-shaped members that project radially outward. In an embodiment where the upper section is a disc-shaped structure an opening could be provided for the insertion of an electrolyte solution or similar such material while the U-shaped lower section is composed of a pair of legs that project radially outward.

As discussed earlier, the flexible electrically conductive member may be made by forming a substantially U-shaped spring contact member with the tab ends of the spring projecting outwardly in opposite directions. The substantially U-shaped portion is placed into the opening in the coiled electrode assembly where it contacts the inner exposed electrode while the tab ends of this flexible electrically conductive member may be welded or secured to a terminal such as the cover of the cell. The substantially U-shaped portion of the flexible electrically conductive member is bent radially outward so that it will exert a radially outward projecting force on the exposed electrode defining at least a portion of the inner wall of the coiled electrode assembly. It is also recommended that any portion of the flexible electrically conductive member above the opening in the coiled electrode assembly be bent inwardly towards the center of the cell so as to reduce the possibility of separator damage and shorting at the top of the coil when the flexible electrically conductive member is positioned into the opening of the coil. The flexible electrically conductive member is preferably positioned such that the legs extends substantially vertically into the central opening in the coiled electrode assembly making contact with the inner exposed portion of the electrode.

The structural dimensions of the flexible electrically conductive member will vary in accordance with the desired size of the cell and the desired size and shape of the aperture in the coiled electrode assembly.

The cross-sectional area of one of the legs of the flexible electrically conductive member that is inserted into the cell may be semicircular, circular, elliptical, or polygonal such as triangular, rectangular, trapezoidal or any other shape. The flexible electrically conductive member may have a tube-like opening through it. One of the requirements is that the U-shaped portion of the flexible electrically conductive member is compressed prior to its insertion into the coiled electrode assembly so that it expands and exerts an outwardly radial pressure on the inner exposed electrode of the coiled electrode assembly. Another requirement is that the bottom portion of the flexible electrically conductive member should not make electrical contact with the base of the cell container.

The material of which the flexible electrically conductive member is made must be electrically conductive and chemically stable in the cell environment. For example, suitable materials for the flexible electrically conductive member could be stainless steel, copper, monel, nickel, tin, steel, nickel-plated steel, copper clad steel, tin clad steel and alloys and combinations thereof and other conductive materials that will not corrode or otherwise deteriorate when in contact with the cell components. Stainless steel is the preferred material for cells utilizing active materials such as oxyhalides as liquid cathode-electrolytes or for solid cathode/organic electrolyte cells such as $Li/MnO_2$ cells.

The cell construction of this invention is suitable for use in cell systems having aqueous or non-aqueous electrolytes such as organic solvent-based electrolyte and liquid inorganic cathode-electrolytes.

Because of the accepted battery polarity of the commercially available power sources it is preferred that the outer exposed electrode which is in electrical contact with the container be the cathode and the inner exposed electrode which is in electrical contact with the cover be the anode. However, in customized cell constructions, the polarity could be reversed to minimize corrosion since the container will be anodically protected.

The cover of the cell for use with this invention may comprise an inner cover and an outer cover. In such circumstances, the inner cover may be composed of a nonconductive material. If the cell utilizes an insulating gasket between the outer cover and the container, then the inner cover may be composed of a conductive or a nonconductive material. When the flexible electrically conductive member has tabs, the tabs may be secured, such as by welding, to the inner or outer surface of the inner cover or the inner surface of the outer cover. When an inner cover is employed the outer cover is positioned over the inner cover and the flexible electrically conductive member may be positioned between the contiguous portions of the two covers and held therein by the clamping coaction of the inner and outer cover. The flexible electrically conductive member could be welded or secured by conventional means to the inner cover if desired. The cell can then be sealed in a conventional manner such as by radial sealing forces which compress the sealing gasket between the container sidewall and the peripheries of the covers. Sealing is completed by crimping the uppermost portion of the container sidewall inwardly over the covers.

Suitable materials for the cover and/or the cell container are nickel, copper, tin, steel, monel, stainless steel, nickel-plated steel, copper clad steel, tin clad steel and alloys and combinations thereof and other conductive materials that will not corrode or otherwise deteriorate when in contact with the cell components.

The thickness of the inner and outer covers may be selected so as to minimize the height of the cover assembly. This is particularly important when the overall dimensions of the cell are fixed and a maximum volume must be devoted to the cell's active components. The inner cover should have a thickness sufficient to sustain its integrity during vacuum filling of the cell with an electrolyte solution and it should resist outside pressure when the pressure within the cell is approximately 20 mm Hg. The outer cover should have a thickness such that the cover assembly will withstand radial and normal cell sealing forces without detrimental deformation.

When the inner cover is composed of a nonmetallic material its thickness will generally be greater than the metallic material of the outer cover and this thickness will depend upon the material selected.

BRIEF DESCRIPTION OF DRAWINGS

The present invention will become apparent from the following description thereof when considered together with the accompanying drawings which are set forth as being exemplary of the embodiments of the present invention are not to scale and are not intended in any way, to be limitative thereof and wherein.

DETAILED DESCRIPTION OF DRAWINGS

Figure 1:
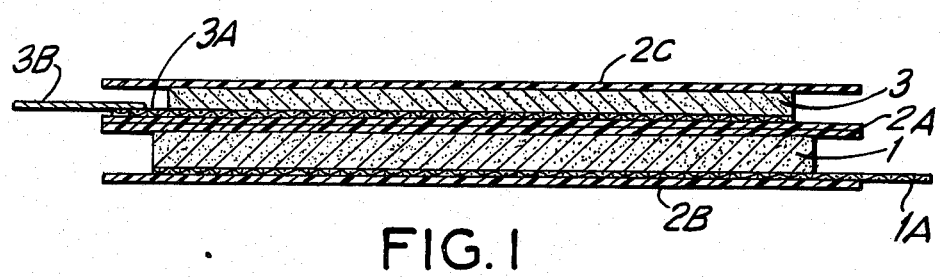
FIG. 1 is an elevational veiw of a electrode assembly before it is coiled.

FIG. 1 is an elevational view of an uncoiled electrode assembly that can be used with this invention. A portion of the anode 3 is embedded in an anode metal carrier 3A. An anode tab 3B may be secured, such as by welding, to the anode metal carrier 3A as shown in FIG. 1. Similarly, a portion of the cathode 1 is embedded in a cathode metal carrier 1A. The cathode metal carrier 1A extends beyond the separator such that when it is coiled, the extended portion will define a portion of the outer or inner wall depending on which end of the electrode assembly is rolled first. The cathode metal carrier 1A and the anode metal carrier 3A are typically strips of metal screen. The anode tab 3B is typically a strip of flat metal that is secured to the anode metal carrier 3A. The cathode metal carrier 1A may have a cathode tab (not shown) secured to it, such as by welding. Separator 2A electrically insulates the anode assembly from the cathode assembly. Separators 2B and 2C may also be used to electrically insulate the anode and the cathode assembly from other components in a galvanic cell. The electrode assembly disclosed in FIG. 1 is similar to the one disclosed in U.S. Pat. No. 4,539,271 issued to G. Y. Crabtree.

Figure 2:
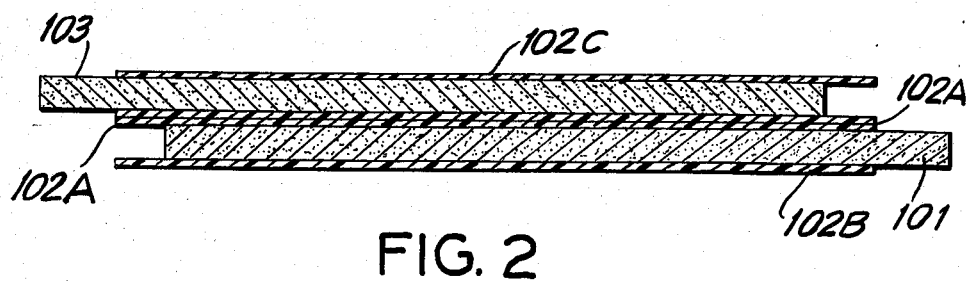
FIG. 2 is an elevational view of another electrode assembly before it is coiled.

FIG. 2 is an elevational view of another embodiment of an uncoiled electrode assembly that can be used with this invention. An anode 103 and a cathode 101 are electrically insulated by separator 102A. Separators 102B and 102C may be used to electrically insulate the anode and cathode assembly from other components of a galvanic cell. The anode 103, cathode 101 and the separators 102A, 102B and 102C are typically flat strips that are superimposed on each other, and this assembly is spirally rolled to form a coiled electrode assembly to be used with this invention.

Figure 3:
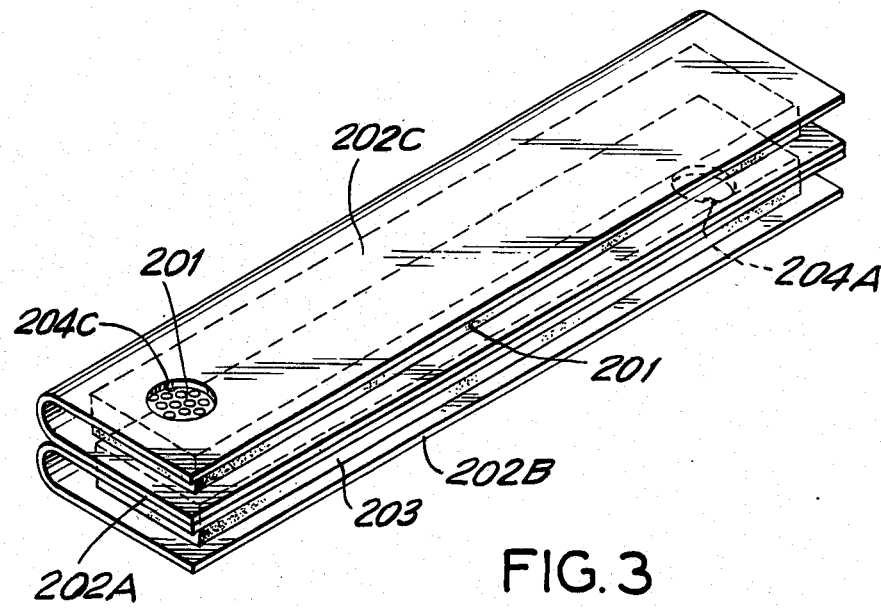
FIG. 3 is an isometric view of yet another electrode assembly beforre it is coiled.

FIG. 3 is an isometric view of yet another embodiment of an uncoiled electrode assembly that can be used with this invention. Anode 203 and cathode 201 are electrically insulated from each other by an inner separator 202A. A portion of the inner separator 202A extends and forms outer separators 202B and 202C. The outer separator 202B has an opening 204A to partially expose a portion of the anode 203. The outer separator 202C also has an opening 204C to partially expose a portion of the cathode 201. The anode 203, cathode 201, the inner separator 202A and the outer separators 202B and 202C could then be rolled to form a spirally coiled electrode assembly such that the opening 204C would be on the inside of the coiled electrode exposing a portion of the cathode 201 which then would define a portion of the inside wall of the coiled electrode assembly. Opening 204A would be on the outside of the coiled electrode assembly exposing a portion of the anode 203 which then would define a portion of the outside wall. The location of the electrodes that are exposed through the openings 204C and 204A could be reversed by coiling the electrode assembly in the opposite direction. After the electrode assembly is coiled the electrode adjacent to the outside opening makes electrical contact with a container of a galvanic cell while the electrode adjacent to the inside opening makes an electrical contact with a flexible electrically conductive member to be discussed below. U.S. Pat. No. 3,900,340, issued to S. H. Greaser and E. T. Russell, discloses coiled electrode assemblies having an opening in an outer separator encasing the coiled electrode assembly. The disclosure of this patent is incorporated herein by reference.

Figure 4:
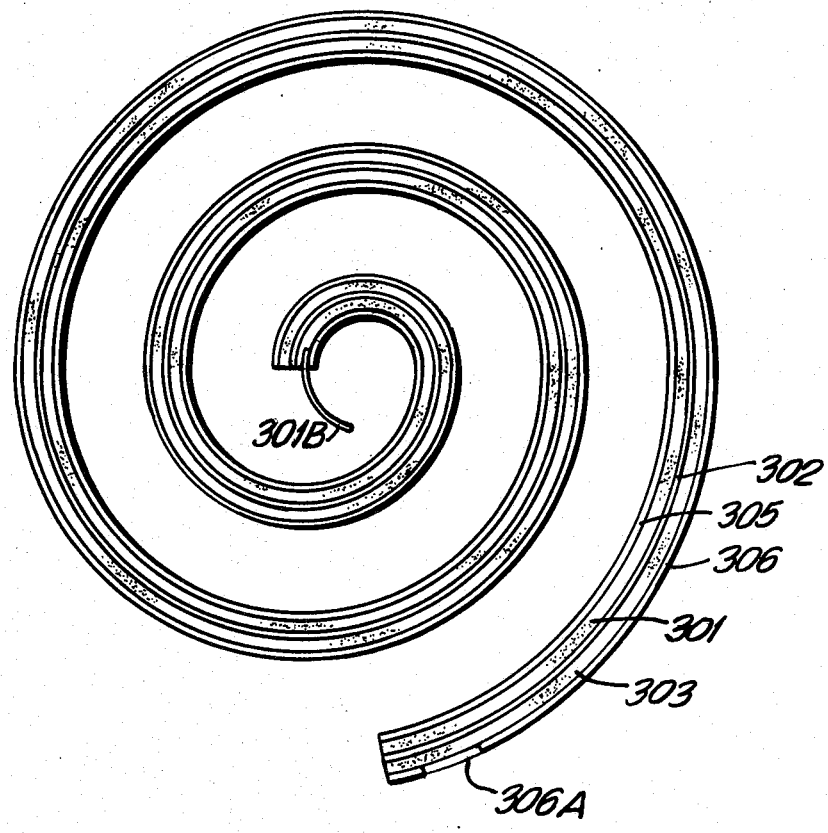
FIG. 4 is a top view of yet another electrode assembly after it has been partially coiled.

FIG. 4 shows a top view of yet another embodiment of a partially coiled electrode assembly that can be used with this invention. An anode 303, a cathode 301 and a separator 302 interposed between the anode 303 and the cathode 301 with separators 305 and 306 are spirally coiled as shown in FIG. 4. The cathode 301 has a cathode tab 301B, and for some applications the cathode 301 may also be attached to a cathode metal carrier (not shown) which in turn will be secured to the cathode tab 301B. The cathode tab 301B defines a portion of the inner wall of the partially coiled electrode assembly and is adapted to make electrical contact with a flexible electrically conductive member to be discussed below. The separator 306 has an opening 306A through which a portion of the anode 303 is exposed and this portion is adapted to make electrical contact with the inner walls of a cell container in which this coiled electrode assembly is placed. Although not shown, the anode 303 could have an anode tab which would be adapted to make electrical contact with the inner wall of a cell container in which this coiled electrode assembly is placed. Similarly, the separator 305 could have an opening through which the cathode 301 would be exposed to make electrical contact with a flexible electrically conductive member to be discussed below. It is to be understood that the locations of the electrodes can be reversed if the direction that the electrodes are rolled is reversed.

Figure 5A:
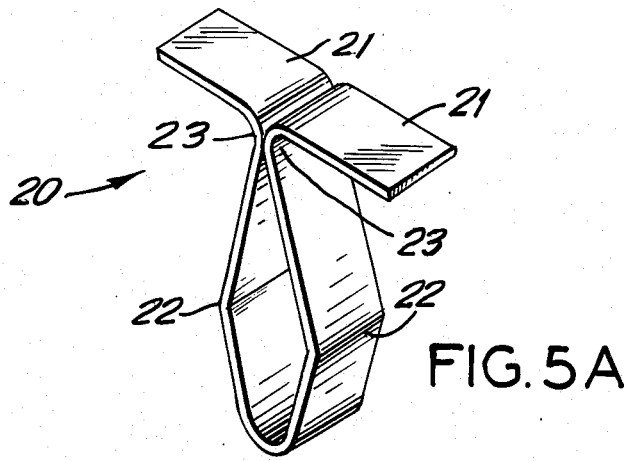
FIG. 5A is an isometric view of a flexible electrically conductive member for use in this invention.

FIG. 5A shows an isometric view of a flexible electrically conductive member 20 prepared by taking an elongated strip of electrically conductive material and folding it into shape as shown. This folding process is done by methods well known in the art. The flexible electrically conductive member 20 has spring-like electrical contact portions 22, a neck portion 23 and tabs 21. The tabs 21 are adapted to be secured, such as by welding, to a portion of the cell's housing such as the inner or outer surface of an inner cover or the inner surface of an outer cover.

Figure 5B:
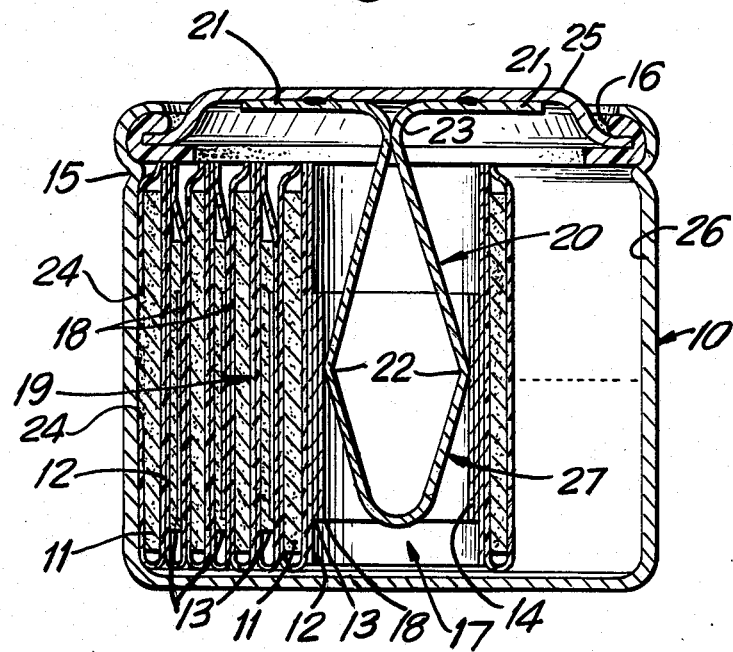
FIG. 5B is a partial elevational view of the cross-section of the preferred embodiment made in accordance with this invention utilizing the flexible electrically conductive member of FIG. 5A.

A preferred embodiment of the coiled electrode assembly cell construction employing the flexible electrically conductive member 20 as shown in FIG. 5A is illustrated in FIG. 5B. Assembled in a container 10 is a cathode 11, a separator 12, an anode 13 and an electrolyte (not shown). The cathode 11, separator 12 and the anode 13, such as shown in FIGS. 1 through 4, are wound into a coil by methods well known in the art. The coiled electrode assembly 19 has an inner exposed anode electrode portion 14 and an outer exposed cathode electrode portion 24. The inner exposed anode electrode portion 14 is of anodic polarity and makes electrical contact with a flexible electrically conductive member 20. The outer exposed cathode electrode portion 24 is of cathodic polarity and makes electrical contact with an upstanding inner wall 26 of the cell container 10 and thereby adapts the cell container 10 as one terminal for the galvanic cell.

The cell container 10 has a base, an upstanding inner wall 26 and a step or shoulder portion 15, as shown in FIG. 5B. The peripheral step or shoulder portion 15 is normally used to provide support to an L-shaped gasket 16 so that a portion of the L-shaped gasket 16 sits or rests in this area and does not slip inside the cell container 10. Prior to the formation of the coiled electrode assembly 19 having an opening 17, a portion of the cathode 11 is left exposed on the outside of the coil which forms the outer exposed electrode portion 24. Similarly, a portion 14 of the anode 13 is left exposed such that when the electrode assembly 19 is spirally coiled the exposed anode portion 14 defines a portion of the inner wall of the coiled electrode assembly 19 within opening 17. The inner exposed electrode portion 14 is shown attached to an expanded metal carrier 18 and a portion of the metal carrier 18 may be left exposed along with the inner electrode portion 14 that is left exposed. The flexible electrically conductive member 20 having the substantially U-shaped portion 27 is inserted into the opening 17. Spring-like electrical contact portion 22 of this substantially U-shaped portion 27 makes physical contact with the inner exposed electrode portion 14 and/or with the expanded metal carrier 18. The spring-like electrical contact portion 22 exerts a radially outward force on the inner exposed andodic electrode portion 14 and/or expanded mwetal carrier 18. This outwardly projecting force insures good electrical contact to the inner exposed anodic electrode of the coiled electrode assembly 19 as well as a positive pressure on the coiled electrode assembly 19. The tabs 21 of the flexible electrically conductive member 20 are secured to the cover 25 normally by welding. The flexible electrically conductive member 20 is first secured, such as by welding, to the cover 25 before it is inserted into the opening 17. After all of the internal cell components have been assembled in the cell container and the cell is ready to be sealed the peripheral edge of the cover 25 is then placed on the seat area of the L-shaped gasket 16. The outer wall of the cell container 10 is then crimped as shown in FIG. 5B.

Figure 6:
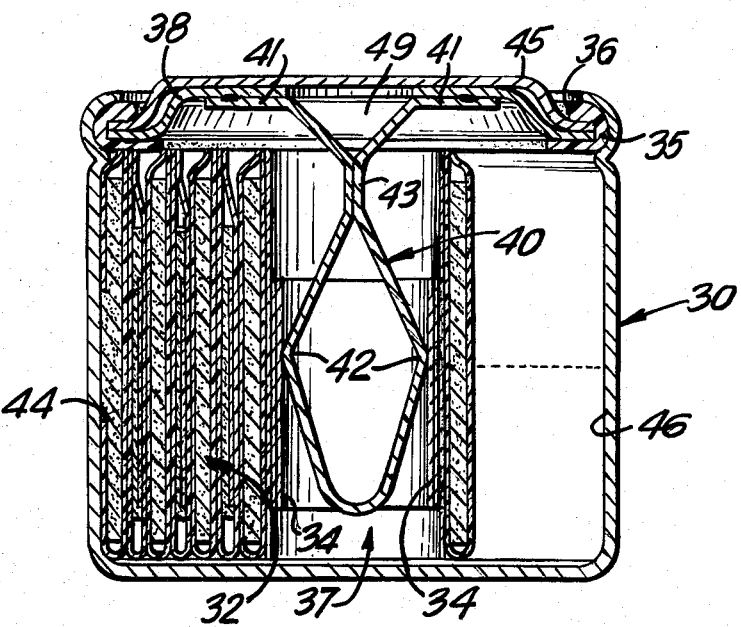
FIG. 6 is a partial elevational view of the cross-section of a second embodiment made in accordance with this invention.

Another embodiment of this invention is shown in FIG. 6. The cell container 30 having an outer cover 45 contains within it a coiled electrode assembly 32 of the type discussed earlier. At least a portion of this coiled electrode assembly 32 is immersed in an electrolyte solution (not shown). The coiled electrode assembly 32 has an inner exposed electrode portion 34 and an outer exposed electrode portion 44. The inner exposed electrode portion 34 is of one polarity and it makes electrical contact with a flexible electrically conductive member 40. The outer exposed electrode portion 44 is of the opposite polarity and it makes electrical contact with the inner wall 46 of the cell container 30.

The cell container 30 has a step or shoulder portion 35. This step or shoulder portion 35 is normally used to provide support to an L-shaped gasket 36. A portion of the L-shaped gasket 36 sits or rests in the step or shoulder portion 35 so that the L-shaped gasket 36 does not slide or slip inside the cell container 30. The flexible electrically conductive member 40 which is substantially U-shaped has arms or tabs 41 that are secured, such as by welding, to an electrically conductive inner cover 38 having an opening 49. The cross-sectional area of the opening 49 may be semicircular, circular, elliptical, or polygonal such as triangular, rectangular, trapezoidal or any other shape. The flexible electrically conductive member 40 that is disposed inside the cell container 30 also has a neck portion 43 and a spring-like electrical contact portion 42. Portions of the arms of the substantially U-shaped flexible electrically conductive member 40 may be welded at the neck portion 43. The coiled electrode assembly 32 typically defines a cylindrical opening 37. The electrically conductive inner cover 38 along with the flexible electrically conductive member 40 secured to it is placed over the coiled electrode assembly 32 such that the electrical contact portion 42 is in electrical contact with the inner exposed portion 34 of the coiled electrode assembly 32 within the opening 37. The spring-like electrical contact portion 42 exerts a radially outward force on the coiled electrode assembly 32. An electrolyte solution is injected into the cell container 30, suitably through opening 49 in the inner cover 38, prior to the closing of the cell container 30 with the cover 45. The peripheral edges of the outer cover 45 and the inner cover 38 are placed over the seat area of the L-shaped gasket 36 and the outer wall of the cell container 30 is then crimped to securely seal the cell as shown in FIG. 6 such that the L-shaped sealing gasket 36 is compressively disposed between the step or shoulder portion 35 and the peripheral edges of the outer cover 45 and the inner cover 38.

Figure 7:
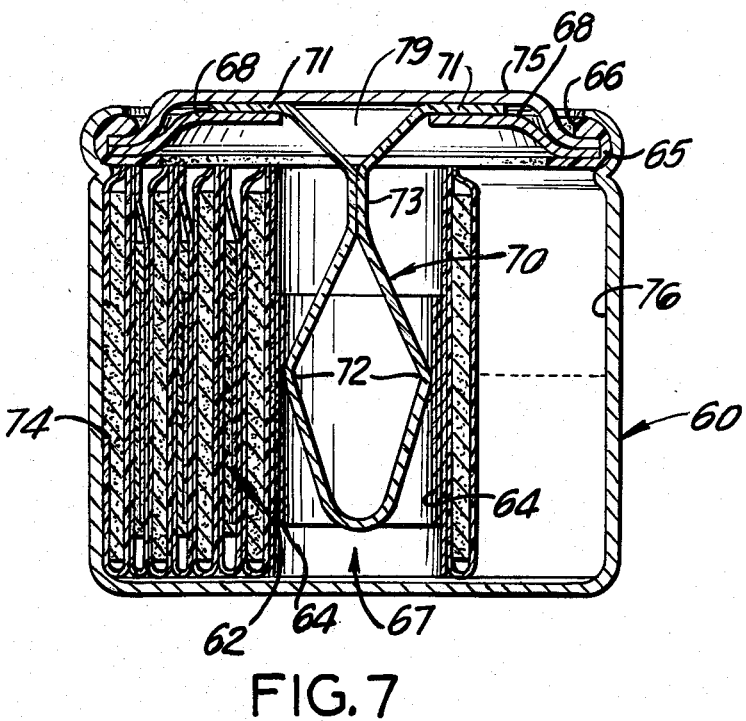
FIG. 7 is a partial elevational view of the cross-section of a third embodiment made in accordance with this invention.

FIG. 7 discloses another embodiment made in accordance with this invention. The cell container 60 contains within it a coiled electrode assembly 62 of the type discussed with respect to FIG. 5B. At least a portion of this coiled electrode assembly 62 is immersed in an electrolyte solution (not shown). The coiled electrode assembly 62 has an inner exposed electrode portion 64 and an outer exposed electrode 74. The inner exposed electrode portion 64 is of one polarity and it makes electrical contact with a flexible electrically conductive member 70. The outer exposed electrode portion 74 is of the opposite polarity and it makes electrical contact with the inner wall 76 of the cell container 60.

The cell container 60 has a step or shoulder portion 65 and is normally used to provide support to an L-shaped gasket 66. A portion of the L-shaped gasket 66 sits or rests in the step or shoulder portion 65 so that the L-shaped gasket 66 does not slide or slip inside the cell container 60. The flexible electrically conductive member 70 which is substantially U-shaped has tabs 71 that are secured, such as by welding, to an inner cover 68 having an opening 79. The electrically conductive tabs 71 may also be secured in electrical contact with the outer cover 75 by the clamping coaction of the inner cover 68 and the outer cover 75. The inner cover 68 may be a strip of metal or a disc shaped cover having an opening in its center. One of the requirements for the inner cover 68 is that its peripheral edges should make contact with the L-shaped gasket 66. The flexible electrically conductive member 70 also has a neck portion 73 and a spring-like electrical contact portion 72. Portions of the arms of the substantially U-shaped flexible electrically conductive member 70 may be welded at the neck portion 73. The coiled electrode assembly 62 typically defines a cylindrical opening 67. The inner cover 68 along with the flexible electrically conductive member 70 secured to it is placed over the coiled electrode such that the electrical contact podrtion 72 is in electrical contact with the inner exposed portion 64 of the coiled electrode assembly 62 within the opening 67. The spring-like electrical contact portion 72 exerts a radially outward force on the coiled electrode assembly 62. An electrolyte solution may be injected into the cell container 60 at this time or at any time prior to the closing of the cell container 60 with the outer cover 75. The peripheral edges of the outer cover 75 are placed over the peripheral edges of the inner cover 68 and the outer wall of the cell container 60 is then crimped to securely seal the cell as shown in FIG. 7 such that the L-shaped sealing gasket 66 is compressively disposed between the cell container sidewall and the peripheral edges of outer cover 75 and inner cover 68.

The inner cover 68 should have a central opening 79 so that the tabs 71 of the flexible electrically conductive member 70 may be inserted through the opening 79 and also the electrolyte solution may be inserted through this opening into the cell prior to the placement of the outer cover 75 and sealing of the cell. The outer surface of the inner cover 68 and the inner surface of the outer cover 75 are contiguously associated such that after the cell has been sealed by conventional methods the flexible electrically conductive member 70 is held in place and is in electrical contact with the conductive outer cover 75.

Figure 8A:
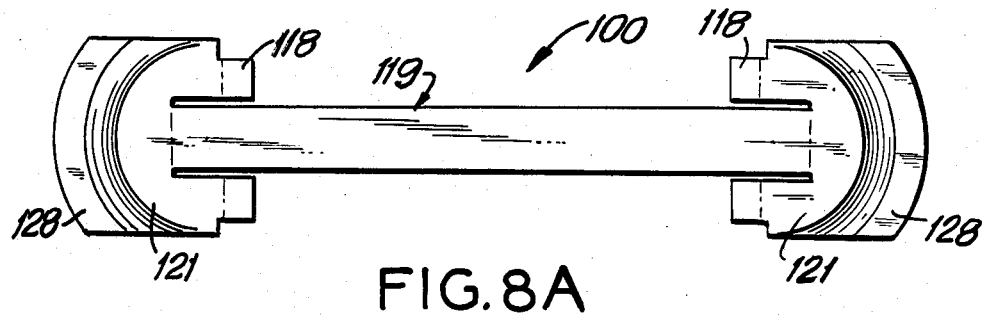
FIG. 8A is a top view of a flexible electrically conductive strip before it is formed into a flexible electrically conductive member.
Figure 8B:
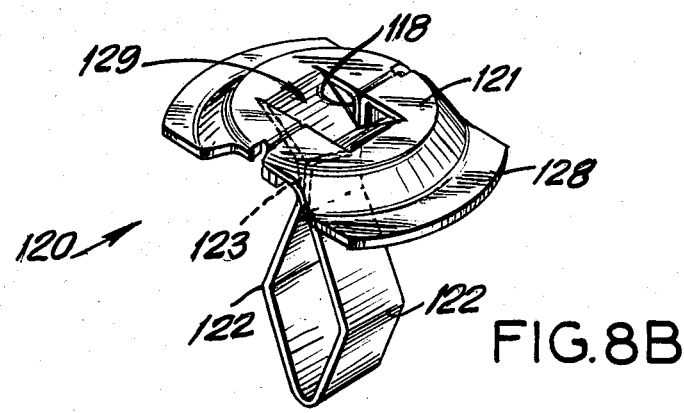
FIG. 8B is an isometric view of the flexible electrically conductive member of FIG. 8A after it has been formed.
Figure 8C:
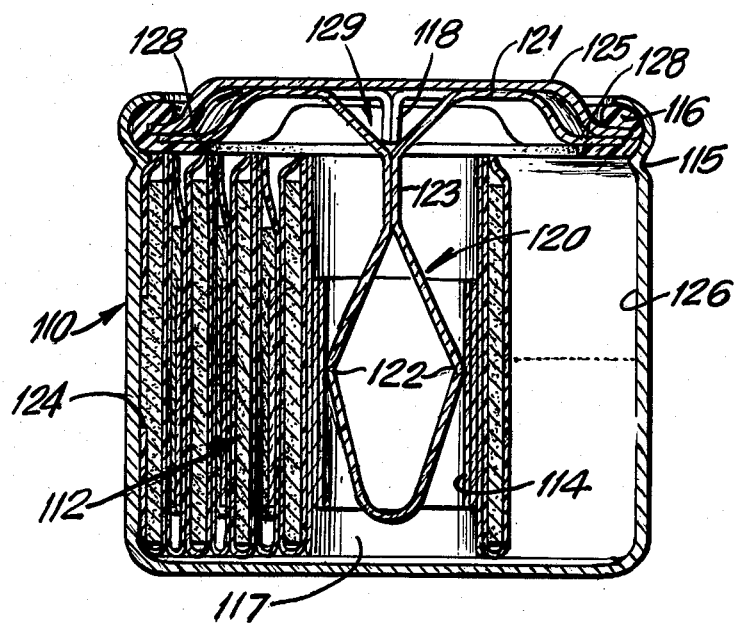
FIG. 8C is a partial elevational view of the cross-section of a fourth embodiment made in accordance with this invention utilizing the flexible electrically conductive member of FIG. 8B.

Another embodiment of this invention is shown in FIGS. 8A, 8B and 8C. FIG. 8A shows the flexible electrically conductive strip 100 before it is formed into the flexible electrically conductive member 120 as shown in FIG. 8B. The flexible electrically conductive member 120 is typically stamped out by processes well known in the art. As shown in FIGS. 8A and 8B, the flexible electrically conductive strip 100 has an elongated portion 119, a plurality of tabs 118, inner contact area 121 and outer contact area 128. The elongated portion 119 is bent as shown in FIG. 8B, so that it forms a neck portion 123 and spring-like electrical contact portions 122. The tabs 118 are bent as shown in FIG. 8B to act as spacers and also to provide rigidity to the flexible electrically conductive member 120. The tabs 118 abut each other to insure that there is no overlapping between the two inner contact areas 121. A portion of the elongated portion 119 that is close to the inner contact area 121 is bent inwardly so as to provide an opening 129 for the insertion of electrolyte solution or similar such material.

FIG. 8C shown a partial cross-sectional view of a galvanic cell having a coiled electrode assembly 112 employing the flexible electrically conductive member 120 as shown in FIG. 8B disposed therein. The coiled electrode assembly 112 has an inner exposed electrode portion 114 and an outer exposed electrode portion 124. The inner exposed electrode portion 114 is of one polarity and it makes electrical contact with the flexible electrically conductive member 120. The outer exposed electrode portion 124 is of the opposite polarity and it makes electrical contact with the inner wall 126 of the cell container 110.

The cell container 110 has a step or shoulder portion 115. This step or shoulder portion 115 is normally used to provide support to an L-shaped gasket 116. A portion of the L-shaped gasket 116 sits or rests in the step or shoulder portion 115 so that the L-shaped gasket 116 does not slide or slip inside the cell container 110. The flexible electrically conductive member 120 is secured in electrical contact with the outer cover 125 by the clamping coaction of the outer contact area 128 and the peripheral edges of the outer cover 125. One of the requirements for the flexible electrically conductive member 120 is that its peripheral edges should make contact with the L-shaped gasket 116. The flexible electrically conductive member 120 that is disposed inside the cell container 110 also has a neck portion 123 and a spring-like electrical contact portion 122. Portions of the arms of the substantially U-shaped flexible electrically conductive member 120 may be secured, such as by welding, at the neck portion 123. The coiled electrode assembly 112 typically defines a cylindrical opening 117. The flexible electrically conductive member 120 is inserted into the opening 117 of the coiled electrode assembly 112 such that the electrical contact portion 122 is in electrical contact with the inner exposed electrode portion 114 of the coiled electrode assembly 112 within the opening 117. The spring-like electrical contact portion 122 exerts a radially outward force on the coiled electrode assembly 112. An electrolyte solution may be injected into the cell container 110 at this time or at any time prior to the closing of the cell container 110 by methods well known in the art.

Figure 9A:
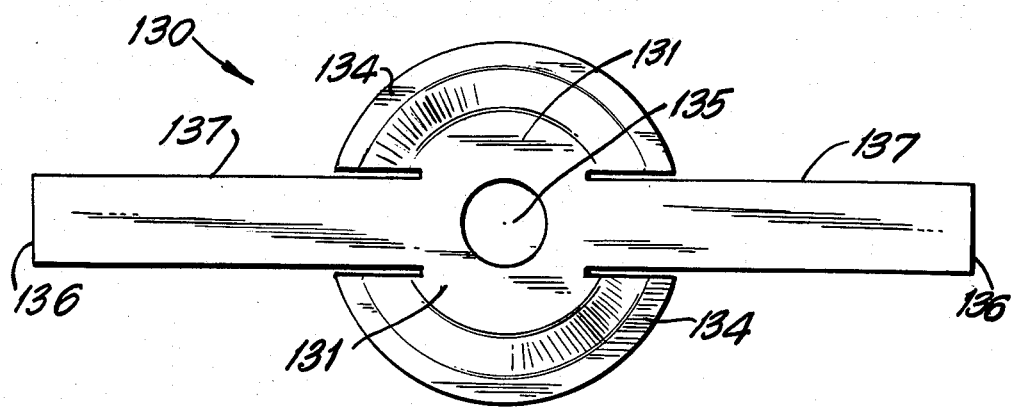
FIG. 9A is a top view of another flexible electrically conductive strip before it is formed into a flexible electrically conductive member.
Figure 9B:
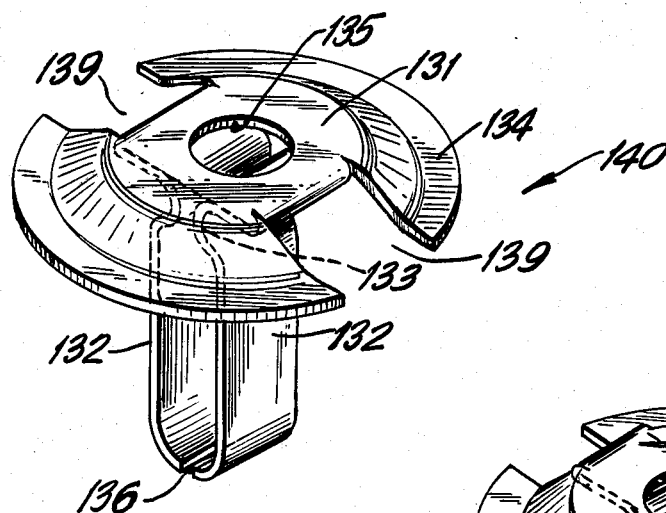
FIG. 9B is an isometric view of the flexible electrically conductive member of FIG. 9A after it has been formed.

Yet another embodiment to be used with this invention is shown in FIGS. 9A and 9B. FIG. 9A is a top view of another flexible electrically conductive strip 130 before it is formed into a flexible electrically conductive member, while FIG. 9B gives an isometric view of the flexible electrically conductive strip 130 of FIG. 9A after it has been formed into a flexible electrically conductive member 140 and is ready to be inserted into a galvanic cell that has a coiled electrode assembly. The flexible electrically conductive member 140 is typically stamped out by processes well known in the art. As shown in FIG. 9A, the flexible electrically conductive strip 130 has two elongated portions 137, an inner contact area 131 and an outer contact area 134. The elongated portions 137 having ends 136 are bent as shown in FIG. 9B, so that they form a neck portion 133 and spring-like electrical contact portions 132. The ends 136 as shown in FIG. 9B may or may not be secured to each other such as by welding. The spring-like contact portion 132 makes electrical contact with the inner exposed area of the coiled electrode assembly and the contact portion 132 exerts a radially outward force therein. It is recommended that an opening 135 be provided in the inner contact area 131 for the insertion of electrolyte solution or similar such material. If an opening 135 is not provided then the electrolyte solution and similar such materials may be injected with the galvanic cell through the opening 139 that is created after the elongated portions 137 are bent as shown in FIG. 9B.

Figure 10:
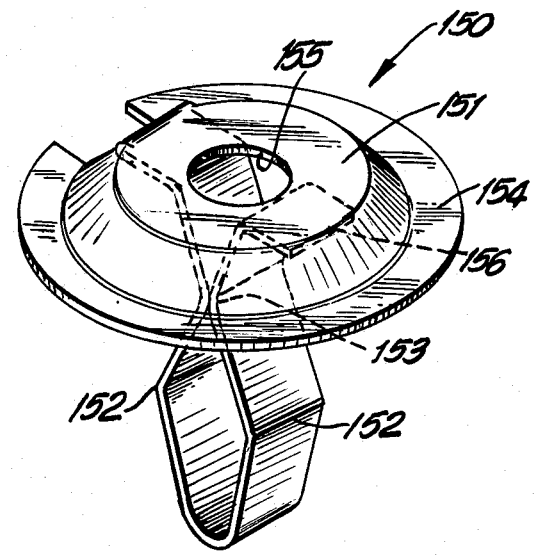
FIG. 10 is an isometric view of another flexible electrically conductive member.

FIG. 10 shows an isometric view of yet another embodiment of the flexible electrically conductive member to be used with this invention. The flexible electrically conductive member 150 having an elongated portion with an end 156 is typically stamped out by processes well known in the art. As shown in FIG. 10, the flexible electrically conductive member 150 has spring-like electrical contact portions 152, a neck portion 153, an inner contact area 151 and an outer contact area 154. The end 156 should be secured to the inner side of the inner contact area 151, such as by welding. The electrical contact portions 152 make electrical contact to the inner exposed area of the coiled electrode assembly and the contact portions 152 exert a radially outward force therein. The flexible electrically conductive member 150 should have an opening 155 for the insertion of electrolyte solution or similar such material.

EXAMPLE

The following examples are intended to further illustrate the invention and are not intended to limit the scope of the invention in any manner.

EXAMPLE 1

Cells were produced in accordance with the previously described invention as shown in FIG. 5B.

A cylindrical container having a 0.447 inch (1.135 cm) outer diameter and a 0.420 inch (1.067 cm) height was filled with a coiled electrode assembly which comprised a 0.063 gram lithium negative electrode layer on an expanded metal carrier and a 0.91 gram positive electrode mix layer (comprised of 88 weight percent $MnO_2$, 3 weight percent polytetrafluoroethylene, 8 weight percent graphite and 1 weight percent calcium hydroxide) which electrode layers were rolled together and separated from each other by polypropylene separators.

The outer diameter of the cover was 0.413 inch (1.049 cm) and the thickness was 0.010 inch (0.254 cm). A conductive spring member made of stainless steel as shown in FIG. 5A was welded to the inner surface of the cover. A polyester sealing gasket having a flange was positioned at the open end of the container. Air within the container was evacuated in less than 1 second to about 28 mm Hg. from the open end of the container, after which about 0.31 ml of electrolyte solution comprised of 50 volume percent propylene carbonate, 50 volume percent dimethoxyethane, 0.5 molar $LiCF_3SO_3$ and 0.5 molar $LiClO_4$ was dispensed into the container and absorbed in about one-half a second. Air was then readmitted into the container.

The flexible electrically conductive member was inserted through the aperture in the coiled electrode assembly. The peripheral edge of the cover was pressed against the flange of the sealing gasket. The cell was sealed by methods well known in the art.

Three cells were made according to the embodiment described in this example. These cells were discharged on a 50 ohm load to a cutoff voltage of 2.0 volts and they delivered an average of 154 miliamp-hours of service.

EXAMPLE 2

Cells were produced in accordance with the previously described invention as shown in FIG. 6. A cylindrical container having an outer diameter of 0.447 inch (1.135 cm) and a height of 0.420 inch (1.067 cm) was filled with a rolled electrode assembly which comprised a 0.063 gram lithium negative electrode layer on an expanded metal carrier and a 0.91 gram positive electrode mix layer (comprised of 88 weight percent $MnO_2$, 3 weight percent polytetrafluoroethylene, 8 weight percent graphite and 1 weight percent calcium hydroxide) which electrode layers were rolled together and separated from each other by polypropylene separators. The inner cover had a 0.401 inch (1.018 cm) outer diameter and a 0.005 inch (0.013 cm) thickness and a 0.109 inch (0.277 cm) diameter aperture in the center. A flexible electrically-conductive member made of stainless steel as shown in FIG. 5A was welded to the inner surface of the inner cover as shown in FIG. 6. A polyester sealing gasket having a flange was positioned at the open end of the container. The flexible electrically conductive member was inserted through the aperture in such rolled electrode. The peripheral edge of the inner cover was pressed against the flange of the sealing gasket. Air within the container was evacuated in less than 1 second to about 28 mm Hg through the aperture in the inner cover, after which about 0.31 ml of electrolyte solution comprised of 50 volume percent propylene carbonate, 50 volume percent dimethoxyethane, 0.5 molar $LiCF_3SO_3$ and 0.5 molar $LiClO_4$ was dispensed through the aperture and absorbed in about one-half a second. Air was then readmitted into the container.

An outer cover having an outer diameter of 0.413 inch (1.049 cm), a thickness of 0.010 inch (0.254 cm) and an inner peripheral surface which was adapted to be contiguously associated with the outer peripheral surface of the inner cover was placed over the inner cover in contact with the sealing gasket. The cell was sealed by radially compressing the sealing gasket between the container sidewall and the peripheries of the covers and by curling the top edge of the container sidewall over the insulated cover peripheries.

Three cells were made according to the embodiment described in this example. These cells were discharged on a 50 ohm load to a cutoff voltage of 2.0 volts and they delivered an average of 159 milliamp-hours of service.

It is to be understood that modifications may be made to the above specification without departing from the spirit of the invention as set forth in the appended claims. Such modifications are within the scope of this invention.

What is claimed is:

1. A galvanic cell comprising a coiled electrode assembly housed in a conductive container having a base with an upstanding wall defining an open end and closed by a cover; said coiled electrode assembly comprising a first electrode, a second electrode superimposed on said first electrode and a separator disposed between said first electrode and said second electrode and over at least one of said first and second electrodes; and said first electrode, second electrode and separator spirally wound such that said first electrode is electronically insulated from said second electrode by said separator and a portion of said first electrode is exposed to define at least a portion of the outer wall of said coiled electrode assembly and a portion of said second electrode is exposed to define at least a portion of the inner wall of said coiled electrode assembly; said coiled electrode assembly disposed within said container such that the exposed first electrode defining at least a portion of the outer wall of said coiled electrode assembly is in pressure contact with said container upstanding wall thereby adapting said container upstanding wall as the first terminal for said galvanic cell; a flexible electrically conductive member disposed within the opening defined by said inner wall of said coiled electrode assembly and pressure contacting at least a portion of the exposed surface of said second electrode and exerting a radially outward force on the exposed said second electrode defining a portion of said inner wall of said coiled electrode assembly; and said flexible electrically conductive member secured to an electrically conductive terminal at the exterior surface of said galvanic cell, said electrically conductive terminal being electrically insulated from said first terminal so that said electrically conductive terminal is adapted as the second terminal for said galvanic cell.

2. The galvanic cell of claim 1 wherein said cover is said electrically conductive terminal.

3. The galvanic cell of claim 1 wherein said first electrode is secured to a collector screen.

4. The galvanic cell of claim 3 wherein an electrically conductive tab is secured to said collector screen.

5. The galvanic cell of claim 1 wherein said second electrode is secured to a collector screen.

6. The galvanic cell of claim 5 wherein an electrically conductive tab is secured to said collector screen.

7. The galvanic cell of claim 1 wherein said flexible electrically conductive member is made of a material selected from the group consisting of nickel, copper, tin, steel, monel, stainless steel, nickel-plated steel, copper clad steel, and tin clad steel.

8. A galvanic cell comprising a coiled electrode assembly housed in a conductive container having a base with an upstanding wall defining an open end and closed by a cover; said coiled electrode assembly comprising a first electrode, a second electrode superimposed on said first electrode and a separator disposed between said first electrode and said second electrode and over at least one of said first and second electrodes; and said first electrode, second electrode and separator spirally wound such that said first electrode is electronically insulated from said second electrode by said separator and a portion of said first electrode is exposed to define at least a portion of the outer wall of said coiled electrode assembly and a portion of said second electrode is exposed to define at least a portion of the inner wall of said coiled electrode assembly; said coiled electrode assembly disposed within said container such that the exposed first electrode defining at least a portion of the outer wall of said coiled electrode assembly is in pressure contact with said container upstanding wall thereby adapting said container as the first terminal for said galvanic cell; a flexible electrically conductive member disposed within the opening defined by said inner wall of said coiled electrode assembly and pressure contacting at least a portion of the exposed surface of said second electrode and exerting a radially outward force on the exposed said second electrode defining a portion of said inner wall of said coiled electrode assembly; and said flexible electrically conductive member secured to an electrically conductive terminal at the exterior surface of said galvanic cell, said electrically conductive terminal being electrically insulated from said first terminal so that said electrically conductive terminal is adapted as the second terminal for said galvanic cell; said flexible electrically conductive member being made by bending a strip of conductive material to form a substantially U-shaped portion having two spaced-apart legs, a portion of the upper end of one leg of said U-shaped portion being bent inwardly to form a neck portion and the extreme upper end of said one leg being bent to form a tab, a portion of the upper end of the second leg of said U-shaped portion being bent in a similar manner as said first leg but in the opposite direction to form a neck portion and a top portion in said second leg, said neck portion of said first leg abutting said neck portion of said second leg with said tab secured to said cover.

9. The galvanic cell of claim 8 wherein said neck portion of said first leg of said flexible electrically conductive member is welded to said neck portion of said second leg.

10. The galvanic cell of claim 1 wherein said separator encases said coiled electrode assembly thereby defining the outer wall of said coiled electrode assembly and wherein an opening is defined in the outer wall defined by said separator to expose a portion of said first electrode so that the exposed portion of said first electrode defines a portion of the outer wall of said coiled electrode assembly.

11. The galvanic cell of claim 1 wherein said separator encases said coiled electrode assembly thereby defining the inner wall of said coiled electrode assembly and wherein an opening is defined in the inner wall defined by said separator to expose a portion of said second electrode so that the exposed portion of said second electrode defines a portion of the inner wall of said coiled electrode assembly.

12. The galvanic cell of claim 1 wherein said cover comprises an inner cover and an outer cover and said flexible electrically conductive member is secured to said inner cover.

13. The galvanic cell of claim 12 wherein said flexible electrically conductive member is made of a material selected from the group consisting of nickel, copper, tin, steel, monel, stainless steel, nickel-plated steel, copper clad steel, and tin clad steel.

14. The galvanic cell of claim 12 wherein said inner cover is composed of a non-conductive material and said flexible electrically conductive member is secured to the outer surface of said non-conductive inner cover.

15. The galvanic cell of claim 14 wherein said flexible electrically conductive member is made of a material selected from the group consisting of nickel, copper, tin, steel, monel, stainless steel, nickel-plated steel, copper clad steel, and tin clad steel.

16. A galvanic cell comprising a coiled electrode assembly housed in a conductive container having a base with an upstanding wall defining an open end and closed by a cover; said coiled electrode assembly comprising a first electrode, a second electroded superimposed on said first electrode and a separator disposed between said first electrode and said second electrode and over at least one of said first and second electrodes; and said first electrode, second electrode and separator spirally wound such that said first electrode is electronically insulated from said second electrode by said separator and a portion of said first electrode is exposed to define at least a portion of the outer wall of said coiled electrode assembly and a portion of said second electrode is exposed to define at least a portion of the inner wall of said coiled electrode assembly; said coiled electrode assembly disposed within said container such that the exposed first electrode defining at least a portion of the outer wall of said coiled electrode assembly is in pressure contact with said container upstanding wall thereby adapting said container as the first terminal for said galvanic cell; a flexible electrically conductive member disposed within the opening defined by said inner wall of said coiled electrode assembly and pressure contacting at least a portion of the exposed surface of said second electrode and exerting a radially outward force on the exposed said second electrode defining a portion of said inner wall of said coiled electrode assembly; and said flexible electrically conductive member secured to an electrically conductive terminal at the exterior surface of said galvanic cell, said electrically conductive terminal being electrically insulated from said first terminal so that said electrically conductive terminal is adapted as the second terminal for said galvanic cell; said cover comprising an inner cover and an outer cover and said flexible electrically conductive member being secured to said inner cover; said inner cover and said flexible electrically conductive member being formed from one integral member.

17. The galvanic cell of claim 16 wherein an aperture is defined in said inner cover.

18. The galvanic cell of claim 16 wherein the upper surface of said inner cover is of similar shape as the lower surface of said outer cover.

19. The galvanic cell of claim 18 wherein an aperture is defined in said inner cover.

20. A galvanic cell comprising a coiled electrode assembly housed in a conductive container having a base with an upstanding wall defining an open end and closed by a cover; said coiled electrode assembly comprising a first electrode, a second electrode superimposed on said first electrode and a separator disposed between said first electrode and said second electrode and over at least one of said first and second electrodes; and said first electrode, second electrode and separator spirally wound such that said first electrode is electronically insulated from said second electrode by said separator and a portion of said first electrode is exposed to define at least a portion of the outer wall of said coiled electrode assembly and a portion of said second electrode is exposed to define at least a portion of the inner wall of said coiled electrode assembly; said coiled electrode assembly disposed within said container such that the exposed first electrode defining at least a portion of the outer wall of said coiled electrode assembly is in pressure contact with said container upstanding wall thereby adapting said container as the first terminal for said galvanic cell; a flexible electrically conductive member disposed within the opening defined by said inner wall of said coiled electrode assembly and pressure contacting at least a portion of the exposed surface of said second electrode and exerting a radially outward force on the exposed said second electrode defining a portion of said inner wall of said coiled electrode assembly; and said flexible electrically conductive member secured to an electrically conductive terminal at the exterior surface of said galvanic cell, said electrically conductive terminal being electrically insulated from said first terminal so that said electrically conductive terminal is adapted as the second terminal for said galvanic cell; said cover comprising an inner cover and an outer cover and said flexible electrically conductive member being secured to said inner cover; said flexible electrically conductive member being made by bending a strip of conductive material to form a substantially U-shaped portion having two spaced-apart legs, a portion of the upper end of one leg of said U-shaped portion being bent inwardly to form a neck portion and the extreme upper end of said one leg being bent to form a tab, a portion of the upper end of the second leg of said U-shaped portion being bent in a similar manner as said first leg but in the opposite direction to form a neck portion and a tab in said second leg, said neck portion of said first leg abutting said neck portion of said second leg with said tabs being in contact with said inner cover.

21. The galvanic cell of claim 20 wherein said neck portion of said first leg of said flexible electrically conductive member is welded to said neck portion of said second leg.

22. The galvanic cell of claim 20 wherein an aperture is defined in the center of said inner cover and said tabs of said substantially U-shaped portion of said flexible electrically conductive member protrude through said aperture of said inner cover and are in contact with the upper surface of said inner cover.

23. The galvanic cell of claim 22 wherein said tabs are secured inside the cell by the clamping coaction of said inner cover and said outer cover.

* * * * *